May 20, 1941.  E. L. HARDER  2,242,950

PROTECTIVE RELAYING EQUIPMENT

Filed Aug. 27, 1938   3 Sheets-Sheet 1

WITNESSES:
Leon M. Garman
Bernard L. Zangwill

INVENTOR
Edwin L. Harder.
BY O. B. Buchanan
ATTORNEY

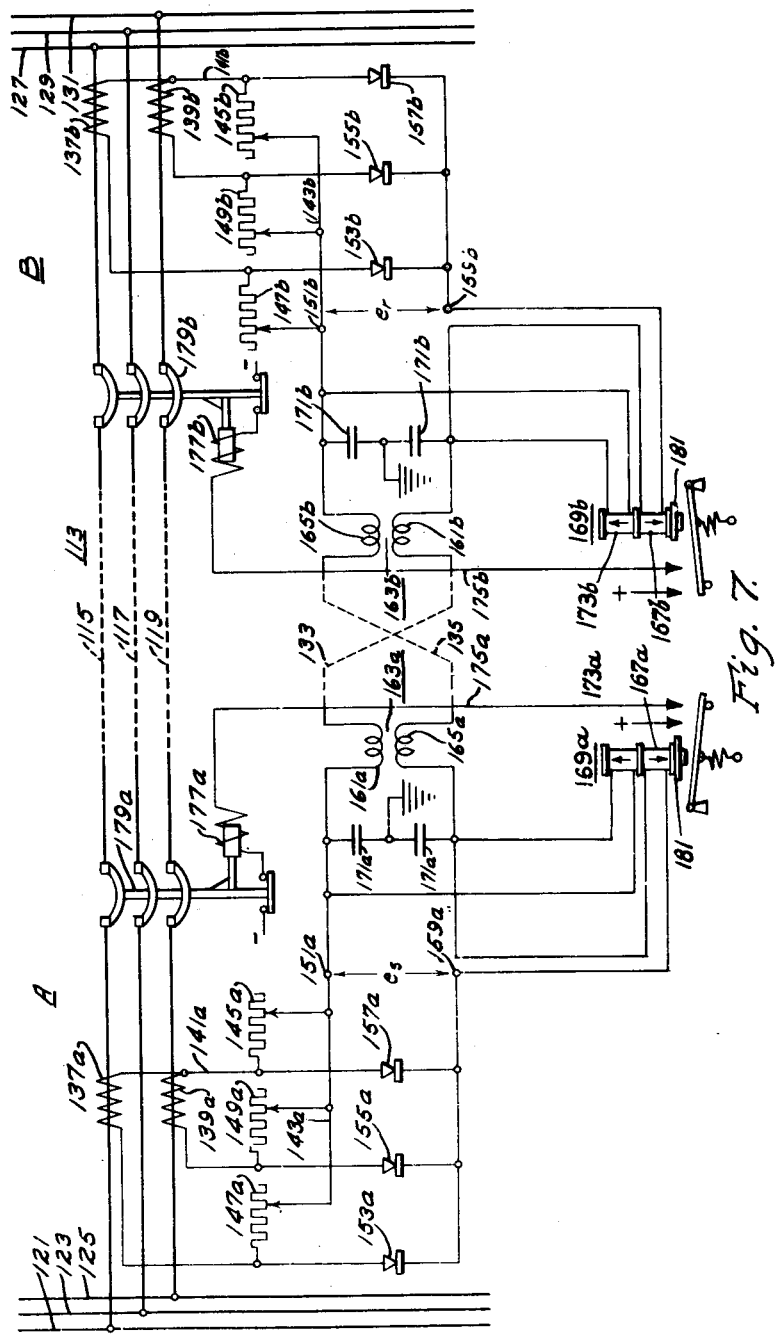

Patented May 20, 1941

2,242,950

UNITED STATES PATENT OFFICE 2,242,950

PROTECTIVE RELAYING EQUIPMENT

Edwin L. Harder, Forest Hills, Pa., assignor to Westinghouse Electric & Manufacturing Company, East Pittsburgh, Pa., a corporation of Pennsylvania Application August 27, 1938, Serial No. 227,085

27 Claims. (Cl. 175—294)

This invention relates to a protective means for alternating current equipment for electrical apparatus, preferably of the polyphase type.

Recent developments in the protection of polyphase electrical apparatus seek to derive a single discriminating function responsive to the different faults against which protection is desired. By discriminating function I mean a relaying bias employed to discriminate between the fault currents against which protection is desired from other load or fault conditions. Well known discriminating functions are over-current, impedance, and the like. A single discriminating function detecting any type of fault with substantially equivalent ease for practical purposes is disclosed and claimed in my copending application Serial No. 183,044, filed January 3, 1938, and assigned to the Westinghouse Electric & Manufacturing Company, now Patent No. 2,183,-646, issued December 16, 1939.

In the instant application, I show modifications operating in a somewhat different manner from that disclosed in the aforesaid application, and employing over-current or impedance as discriminating functions; and further to show the flexibility of the broad application of my invention for protective purposes an embodiment is disclosed which embraces a ratio differential protective scheme for a section of a transmission line.

More specifically, in this disclosure, the several phase currents and their residual ground current, if any, are reduced to unidirectional electrical quantities which are utilized for obtaining the single discriminating function. In obtaining the unidirectional quantities no moving parts are required, and no elements employed which retard the response of these quantities to the changes of the current characteristics flowing in the apparatus protected. The discriminating function is responsive at all times to individual values of different phase and residual ground currents which, in the last analysis, form the components of the fault currents. Whatever the type of fault, at least two of these values are abnormal and since my protective system is responsive to these components, it will operate upon the occurrence of any type of fault.

The unidirectional quantities or factors I prefer to employ are voltages, and by connecting them in manners to be later described, I obtain the single discriminating function. The discriminating function being single, it may be applied between two points so that a single control or responsive device only need be employed to effect the protective operation. The single control may be an electromagnetic or electronic tube relay or may be incorporated into a protective carrier current system or the like for controlling the operation thereof. The relay can be such that a rapid response of the protective means to abnormal conditions is obtained.

The discriminating function is the resultant of unidirectional voltages derived through rectifiers from impedances connected to measuring transformers coupled to the phase lines, preferably in such manner as to give a residual ground component also. The unidirectional voltages are connected in parallel but with no possible circulating currents, and the discriminating function is, therefore, the largest of the voltages at any instant. By making the separate impedances variable any desired weighting may be given to the quantities or factors making up the discriminating function.

This invention is particularly applicable to overload protection at a single location, but it is not necessarily limited thereto, and by a slight modification I have applied the general principles to a two-wire differential pilot system, wherein a current entering a terminal of an electric apparatus or machine such as a section of a transmission line is compared to the current leaving the second terminal of that apparatus or machine. When the two are substantially equal no discriminating or selective operation of the relays at each terminal occurs, but upon the occurrence of an internal fault operation of one or both of the relays results which, in turn, controls equivalent to isolate the aforesaid section. I show the characteristics of my invention applied to a ratio differential pilot wire protective system, but they may be fitted, as is well known to the art, into any one of a number of different types of protective pilot wire means of the same general character, and of which a number have been described in my aforesaid application. Because the discriminating function in this case uses as factors unidirectional voltages applied to the terminals of the pilot wires, I prefer to employ my self-neutralizing transformer and drainage system described and claimed in my copending application Serial No. 212,451 filed June 8, 1938, and assigned to the Westinghouse Electric & Manufacturing Company, for the purpose of reducing to a harmless degree the otherwise deleterious effects of extraneously induced voltages on the pilot wires.

The objects, advantages and applications of my invention are numerous and generally embrace the features hereinbefore indicated and others not specifically mentioned, and which will be apparent from the following description, taken in conjunction with the drawings in which like reference numerals refer to like parts and in which:

Fig. 7 is a schematic diagram of a simplified ratio differential protective system embodying my invention applied to a section of a transmission line.

Figure 1:
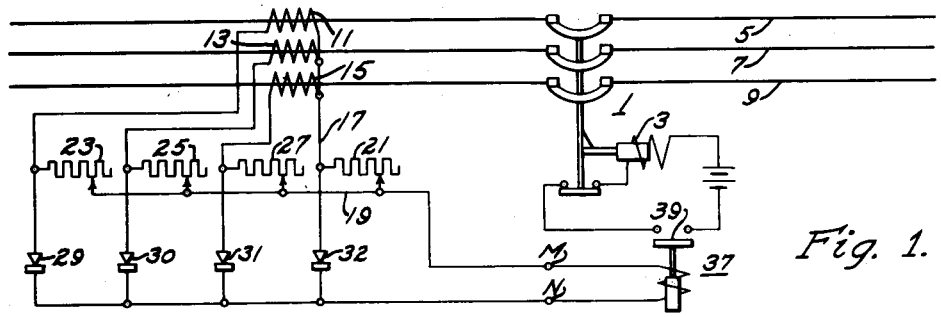
Figure 1 is a schematic wiring diagram for straight overload protection employing half wave rectification.
Figure 2:
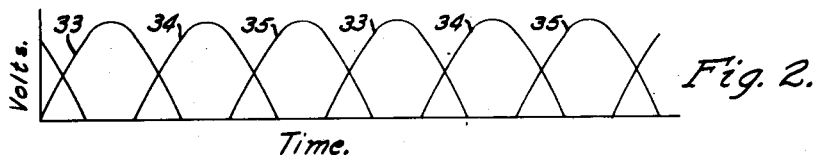
Fig. 2 is a curve showing the factors or quantities which make up the discriminating function of the system of Fig. 1 with balanced phase currents.
Figure 3:
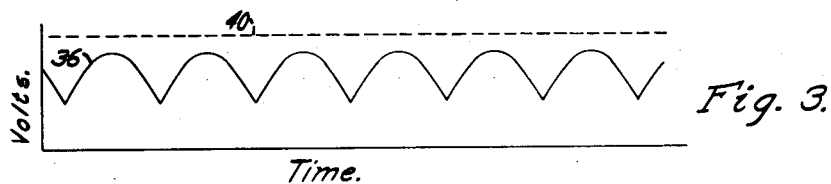
Fig. 3 is a curve showing the resultant discriminating function.

Referring more particularly to Figs. 1, 2 and 3, the circuit breaker 1, opened through the medium of trip coil 3, controls the flow of power to an electric unit represented by lines 5, 7 and 9. Each of the lines 5, 7 and 9 represents a separate phase of a three-phase apparatus or machine, and a measure of the current in each of the phases is obtained by a means comprising current transformers 11, 13 and 15 connected in star with the neutral lead comprising two conductors 17 and 19 between which is connected a variable impedance 21. The other ends of the secondaries of the current transformers 11, 13 and 15 are connected to the conductor 19 through variable impedances 23, 25 and 27, respectively. In the application of my invention I prefer to make the impedances 21, 23, 25 and 27 variable resistances and they have been symbolically so shown in the drawings, and are referred to as resistances in the subsequent description for the purposes of simplicity.

The individual voltages across the respective resistances are the sources from which the factors composing the single discriminating function are obtained. The voltages are applied in parallel across the arbitrarily-chosen points M and N after having been made unidirectional by rectifiers 29, 30, 31 and 32. This produces a single unidirectional relaying voltage, pulsating in this instance, across the points M and N, by "unidirectional" meaning that the electrical quantity, for example, voltage or current, is poled in one direction only either continuously, or repetitiously.

In operation, the resistances 23, 25 and 27 are preferably made equal, and the voltage across points M and N due to each resistance with normal balanced currents in the lines 5, 7 and 9 are shown in Fig. 2. The curves 33 are the rectified half waves across 23, the curves 34 the rectified half waves across 25, and the curves 35 the rectified half waves across 27. There will be no resultant voltage across resistance 21 and the neutral since the phase currents are assumed balanced. The voltages represented by 33, 34 and 35 are applied across the points M and N in parallel, but because of the rectifiers no circulating current occurs except that which might go to any apparatus connected across M and N. At any instant the voltage across M and N will be the highest valve of the individual curves 33, 34 and 35. Obviously, this is the envelope of the curves and is represented in Fig. 3. This envelope is the discriminating function 36 for the embodiment of Fig. 1 under normal balanced-current conditions.

The discriminating function 36 may be seen to be an individual or single unidirectional voltage and represents the instantaneous voltage across the points M and N. Any appropriate responsive device may be connected across these two points for operation when any part of the discriminating function is beyond a predetermined value, minimum or maximum. In Fig. 1 I have shown a marginal relay 37 whose contactor 39 controls a circuit to the trip coil 3. The relay 37 is such that it will not operate unless the voltage across M, N increases above a value, represented by the dash line 40, deliberately chosen to be slightly greater than the instantaneous values of the permissible maximum normal load voltage factors 33, 34 and 35 and therefore also of the permissible maxima of the discriminating function 36.

In the event of an abnormally high current in one or more of the lines 5, 7 and 9 the discriminating function will vary from the representative curve 36 and have one or more "humps" which will rise above the value represented by the dashed line 40, and will cause operation of the relay 37, whereupon the circuit breaker 1 is tripped.

The value of the resistance 21 will depend upon the manner in which the system represented by lines 5, 7 and 9 is grounded, and is chosen to give a desired weighting to the residual ground current that flows when a fault involving ground occurs. In such instance the factor, due to the drop across 21, will be superimposed upon the curve of Fig. 2 and where the instantaneous voltage of this ground factor is greater than that of the envelope of the three phase factors, the discriminating function will necessarily follow the ground factor at such instant. By properly adjusting the resistance 21 the ground factor may be made a dominating value for operating the relay 37 in the event of a ground fault.

Figure 4:
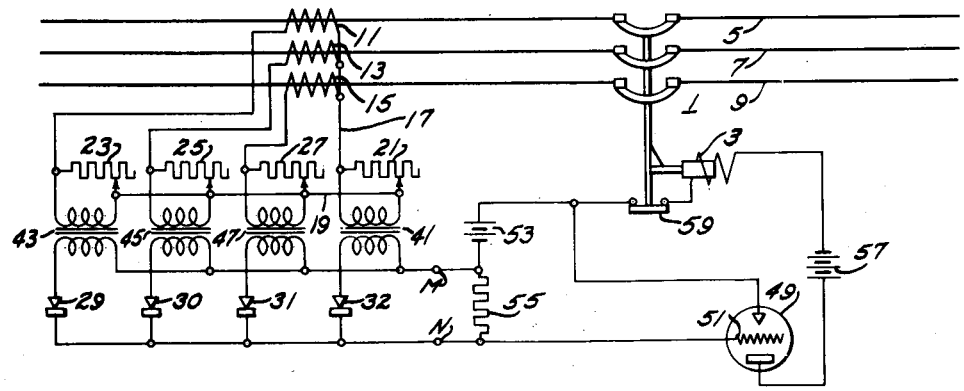
Fig. 4 is a schematic diagram of a modification of the system of Fig. 1.

The system of Fig. 4 operates along the same general principles as that of Fig. 1. However, the voltage factors such as 33, 34 and 35 are not obtained directly from the drop across resistances 21, 23, 25 and 27, as in Fig. 1, but from the secondaries of transformers 41, 43, 45 and 47, the primaries of which are connected respectively across the aforesaid resistances. By means of the transformers I can change the amplitudes of any or all of the voltage factors from which the discriminating function is derived. Moreover, by reversing the polarity of one or more of the windings of the transformers I can change the relationship of the voltage factors with respect to each other. The voltage factors due to the system of Fig. 4 when the transformers have a 1 to 1 ratio and are all poled the same way are identical to those obtained from the system of Fig. 1. Fig. 4 also differs from Fig. 1 in that a tube relay 49 is the means responsive to the discriminating function across points M and N. The tube may be any one of a number of well known types, but I have shown a grid glow tube, the grid 51 of which is normally biased negative by a battery 53.

A leakage resistance 55 of high value is connected across the points M and N while the battery 57 maintains a plate of the tube at a positive potential.

The polarity of the unidirectional voltage of the discriminating function across points M and N is opposed to that of battery 53, the latter being chosen of such value that the tube will not conduct current so long as the discriminating function does not exceed the minimum response value thereof, which obtains under normal conditions. Under abnormal conditions of current the value rises until the algebraic sum of an instantaneous voltage of the discriminating function and the battery voltage is sufficient to render the tube conducting. The flow of plate current will then energize the trip coil 3 to operate the circuit breaker 1. The interlock switch 59 operated by the movement of the breaker assures interruption of the plate current after the lines 5, 7 and 9 have been disconnected.

Figure 5:
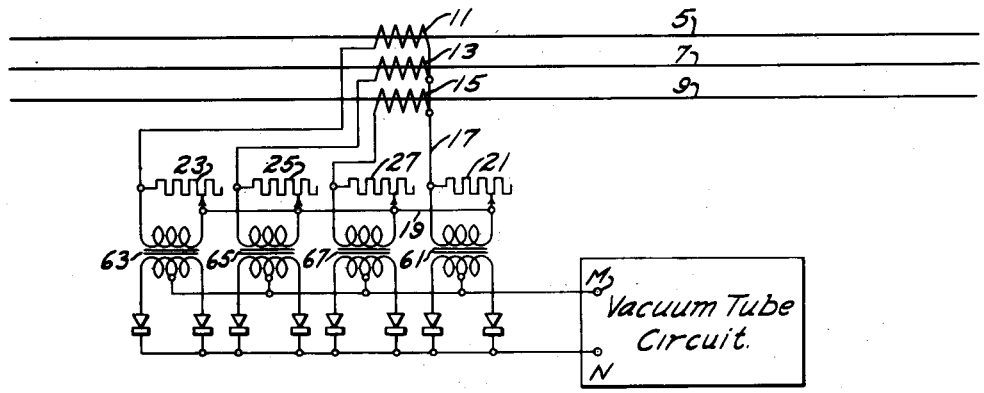
Fig. 5 is a schematic diagram of a further modification in which full wave rectification is employed.

In both Figs. 1 and 4, half wave rectification is employed and yields a discriminating function for normal currents having three humps or maxima every 360 electrical degrees. The discriminating function can be made somewhat smoother by employing full wave rectification and this expedient is shown in Fig. 5. The transformers 61, 63, 65 and 67 have their secondary midpoints connected to the point M, while the ends of the secondaries connect to the point N through individual rectifiers, as shown. Accordingly a smoother discriminating function under normal conditions is obtained, with six maxima in each electrical cycle and higher minima values. The responsive device of Fig. 5 is shown diagrammatically as a vacuum tube circuit and when the voltage across M and N exceeds the responsive value the circuit is controlled to accomplish the control or protective operation, in an obvious manner.

Figure 6:
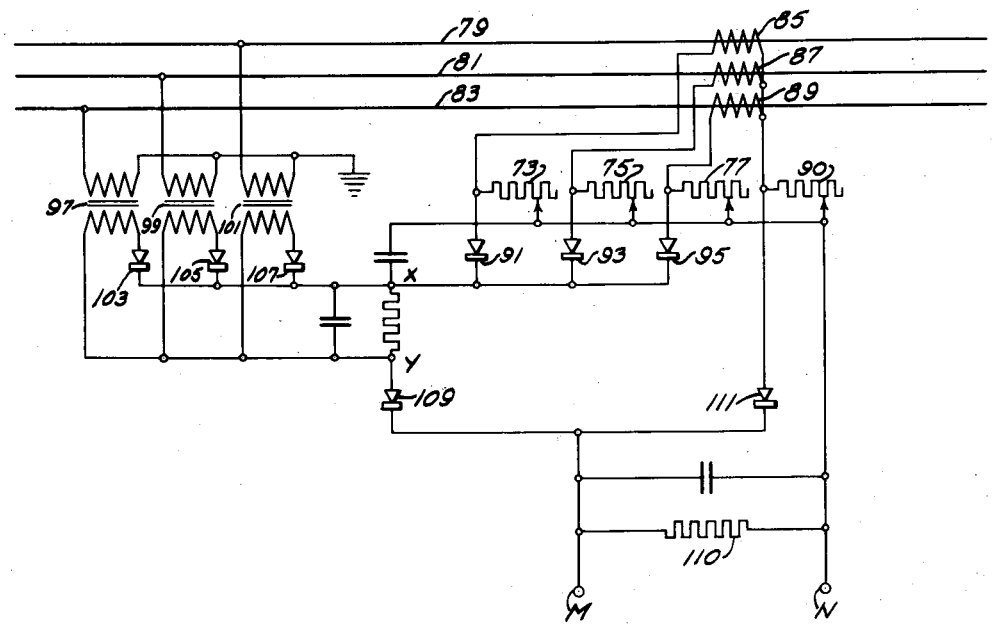
Fig. 6 is a schematic diagram of a protective means relying upon impedance as a measure of the protective action for phase faults and overcurrent for faults involving ground.

The discriminating function in the embodiments of Figs. 4 and 5 is obtained directly from the currents in each of the phases 5, 7 and 9, and therefore provides protection against overloads of faults involving abnormal currents. In Fig. 6, however, the discriminating function is obtained from the voltage over current ratio, or impedance.

The drops across resistances 73, 75 and 77 are derived from the currents in the three lines 79, 81 and 83 through current transformers 85, 87 and 89, as in the previously described embodiments. The drop across 99 is that due to the residual ground current, while the drops across 73, 75 and 77 are due to the phase currents. The drops across 73, 75 and 77 are rectified by half wave rectifiers 91, 93 and 95 and applied across the points N and X.

Potential transformers 97, 99 and 101 are employed to derive a discriminating function across points X and Y responsive to the line voltages. Half wave rectifiers 103, 105 and 107 are inserted in the secondaries to assure a unidirectional discriminating function from this source. Rectifiers are inserted in the leads to the point X to yield a discriminating function derived from the potential transformers which is opposed to that derived from the current transformers, so that two voltages are opposed.

In practical operation I prefer to have the resistances 73, 75 and 77 equal and adjusted to yield voltages across the N and Y which satisfies the equation $$E - KI = 0 \qquad (1)$$

E represents the voltage of the discriminating function across X and Y on the lines; K is a parameter dependent on the farthest point on the transmission line for which the system is responsive to phase faults and is chosen to represent the balance point or distance up to which faults operate the system of Fig. 6; and KI represents the voltage of the discriminating function across N and X through the lines 79, 81 and 83; and Equation 1 is satisfied for faults at the balance points. For faults before this point E is less than KI and the system is made operative.

The point Y is connected to the connection point M through a rectifier 109 as an added precaution against circulating currents, and the condensers shown are also added refinements to smooth the voltage curves of the discriminating functions. A high resistance 110 may be connected across the points M and N if the responsive device comprises an electronic tube to be connected across the points M and N.

For a phase fault at a given point on the transmission line, the voltage and current at the relay system (Fig. 6) have a ratio equal to the impedance from the relaying point to the fault. The relay just balances for faults at this point and this balance is represented by Equation 1. For faults beyond this point, the E is a little higher and I down, and the system will not respond. For faults nearer to the relay system, I is higher and E lower and the system will respond. Thus the balance point is the location of a fault along the line beyond which the system is unresponsive and before which it is responsive.

During non-responsive current conditions Equation 1 is either satisfied or is within a range of variable values with E greater than KI. During abnormal conditions as might accompany a fault, E for one or more phases will be appreciably lowered and may even approach zero while the KI component increases due to the increased current. Variations of the discriminating function across M and N therefore will have certain predetermined characteristics for abnormal or fault conditions, and by applying the responsive device across M and N to respond to the characteristics accompanying the abnormal conditions a non-directional, phase impedance fault detector obtains. The responsive device may be an appropriate electromagnetic or tube relay, or tube circuit, or any other well known control of which the responsive means of the prior embodiments are examples. If desired or necessary, the expedients of Figs. 4 and 5 involving in the first instance, transformers with half wave rectification, and in the second instance transformers with full wave rectification can be obviously applied to the system of Fig. 6, and in this sense Figs. 4 and 5 may be deemed to show parts of the system of Fig. 6 in different form.

The system of Fig. 6 is made responsive directly to ground-components of fault-currents by connecting the ends of resistance 99 directly to the points M and N, employing, of course, the rectifier 111 in the conductor to the point M for the purpose of deriving a properly poled unidirectional voltage, and to prevent circulating currents.

It may be observed that the residual ground discriminating function is connected in parallel with the impedance discriminating function and either will determine the response at any instance depending on which is the higher in value. By adjusting resistance 99 the ground discriminating function may be given any desired weighting.

Referring to the embodiment shown in Fig. 7, the polyphase electric machine is indicated as a polyphase transmission line section 113 comprising a three-phase line for the purposes of illustrating my invention, although it is obvious that the teachings of my invention for obtaining a unidirectionally pulsating quantity representative of the residual ground or zero-component current of the line-currents can be applied to a transmission line such as shown in Fig. 7, by one skilled in the art. The section 113, comprising conductors 115, 117 and 119, runs between two stations (not shown) having power buses 121, 123, 125 and 127, 129, 131, respectively. Protective terminal equipment is provided at each of the terminal ends A and B of the section for the purpose of protecting it against internal faults and pilot wires 133 and 135 interconnect the terminal equipment.

The equipment at each of the terminals is similar and a description of one will suffice. However, for purposes of identifying each, when necessary, the reference numerals applied to the identical units at each terminal are the same, but those applied to the equipment A are given the suffix $a$ while those applied to the equipment at B are given the suffix $b$.

The terminal equipment at A comprises two current transformers 137a and 139a connected to two of the three phases of the line section. The secondaries of these transformers are star connected having common or neutral leads 141a and 143a with a series resistance 145a between them. The secondaries of the transformers 137a and 139a are connected to the neutral lead through resistances 147a and 149a, respectively. In the particular instance the value of the resistance 149a is deliberately chosen to be different from the value of the resistance 147a, and in actual practice I prefer to have a ratio of values of approximately 2 to 1. The value of the resistance 145a will depend entirely on the weighting desired, and is preferably different in value from either 147a and 149a, preferably in excess of either, so that the rectified half waves derived from the three separate resistances 145a, 147a and 149a will have different maximum values, respectively. The neutral conductor 143a terminates at a point 151a, while the other ends of the resistances are connected through rectifiers 153a, 155a and 157a, respectively, to the point 159a. This construction thus far described follows closely the construction of the embodiment of Fig. 1 and a discriminating function will be present between the points 151a and 159a which may be represented by $e_s$.

The equipment for terminal B is the same as that at terminal A, and connected so that there results a discriminating function across the points 151b and 159b which is represented by $e_r$.

As aforesaid, the pilot wires 133 and 135 extend between the terminal equipment. The pilot wire 133 is connected between the points 151a and 159b through the windings 161a and 161b of self-excited neutralizing transformers 163a and 163b; while the pilot wire 135 is connected to the points 159a and 151b through the other windings 165a and 165b of the neutralizing transformers. The pilot wire circuit includes in series the coils 167a and 167b of ratio differential relays 169a and 169b at each of the terminals respectively. Drainage condensers 171a and 171b are connected across the pilot wires at the terminal side of the neutralizing transformers and have their central point grounded, as shown. The self-excited neutralizing transformers and drainage condensers form a means by which the system is relatively immune from extraneous voltages induced upon the pilot wires from an external source, as more fully explained and claimed in my copending application Serial No. 212,451 mentioned previously.

Across the ends of the pilot wires at each terminal is connected one of the coils 173a and 173b of the two-coil differential relay 169a and 169b, respectively, the other coils of which are connected in series with the pilot wires as previously described. For the terminal A the relay 169a controls a circuit 175a including a trip coil 177a for operating a circuit breaker 179a, and similar equipment is provided at terminal B controlled by relay 169b. As previously stated, the equipment at terminal B duplicates that of terminal A. However, under normal conditions, in the particular embodiment being described, the voltage across points 151b and 159b is required to be the same in direction as the voltage across 151a and 159a with respect to the pilot wire system, in phase, and connected so that a circulating current is present in the pilot wire system. This requires that the pilot wires 133 and 135 be crossed.

In the pilot system of Fig. 7, with through currents in section 113 due either to normal conditions within or abnormal conditions outside the section, the voltages $e_s$ and $e_r$ normally act in series with each other and no resultant operation of either of the relays 169a or 169b occurs, because a restraint current is circulated through the restraint coils 167a and 167b which is proportional to the load current transmitted through the line section while the current in the operating windings 173a and 173b is negligible.

In the event of an internal fault on the protected line section, that is, a fault occurring within this line section, current will be supplied for this fault from both ends of the protected line section if the buses 121, 123 and 125 and 127, 129 and 131 are power buses, or will be supplied at one end only with the current at the other terminal considerably lower in the event that one set of buses only supplies power. The discriminating voltages $e_s$ and $e_r$ will now be out of phase rather than in phase as in normal conditions or may differ in magnitude, or both. Current will then flow through the operating coils as well as through the restraining coils, but inasmuch as the former is deliberately made the stronger, operation of a relay 169a or 169b, or both, occurs, with the resultant operation of the circuit breaker 179a or 179b or both.

The discriminating functions $e_s$ or $e_r$ may be obtained empirically by plotting the voltage across the separate resistances each amplified by a factor proportional to the expected currents through the lines 115 or 119 under the diverse conditions, normal and fault. In order to ensure a satisfactory ratio differential between the two discriminating functions under fault conditions, the ratio of the resistances 147a and 149a, or 147b and 149b, is preferably made in the order of 2 to 1.

The relays 169a or 169b can be made to respond in a fraction of a cycle or may be delayed to any desired extent by damping winding 181. The possibility of gradation of the time of operation of the relays to some time delay value makes possible a control of the time of operation of the circuit breakers 119a and 119b.

It is obvious that the expedients shown in Figs. 1, 4 and 5 can be utilized in the protective system exemplified in Fig. 7, in which different terminals of a protected apparatus include a communication-channel means comprising, as a special instance, a pair of pilot wires extending between the terminals. At the respective terminals the circuit breakers effect, when operated to circuit-interrupting position, a disconnecting or segregating of the transmission line from the buses or other lines at each terminal. Each terminal comprises a relaying point or a measuring point for the location of a fault-responsive means which comprises means for deriving a measure of the line-conditions at the associated terminal from which are obtained the unidirectionally pulsating factors or quantities such as indicated at 33, 34 and 35 of Fig. 2, which can be individually utilized, or which can be combined to provide the single unidirectionally pulsating relaying quantity which is instrumental in determining whether or not the circuit breaker or breakers are to be operated by the force-producing means, such as the ratio differential relay 169a.

Generally, in the embodiments described, the phase angle between the discriminating factors at any terminal will have no appreciable effect on the registration or response for the reason that each factor has its own influence across the response points. In other words, the registration need not be dependent upon a resultant of two or more component factors of a station but is the highest of several factors. However in Fig. 6 a resultant of fundamental quantities is employed to obtain the responsive registration, and in Fig. 7 the comparison of fundamental quantities at each end may include phase angles.

While I have described my invention in a form which I believe to involve the best applications thereof at present, it is obvious that many other modifications and refinements may also exist. It is desired, therefore, that my invention be limited only by the teachings of the prior art.

I claim as my invention:

1. In a polyphase electrical system, a protective system for said electrical system with means for deriving unidirectional operating factors equivalent to $K_1I_1$, $K_2I_2$—where K is a constant and I represents the instantaneous current in phases 1, 2,—and function means for combining said factors into a discriminating function for responsive registration, and whose value at any instant is the value of the maximum one of said factors at said instant.

2. In a polyphase electrical system, a protective system for said electrical system with means for deriving unidirectional operating factors equivalent to $K_0I_0$, $K_1I_1$, $K_2I_2$—where K is a constant and I represents the current in phases 1, 2—but with the subscript zero representing the residual ground current, and means for combining said factors into a discriminating function for responsive registration, and whose value at any instant is the valve of the maximum one of said factors at said instant.

3. An electrical system for a polyphase alternating current machine comprising, individual means for separate phases for obtaining a unidirectional factor of an electrical quantity of the corresponding phase current, means for obtaining a unidirectional factor of the residual ground current of the current in the phases of said polyphase machine, and single means operated when any one of said factors is beyond a predetermined value.

4. An electrical system for a polyphase alternating current machine comprising, individual means for separate phases for obtaining a unidirectional factor of an electrical quantity of the corresponding phase current, and a single means operated when any one of said factors is beyond a predetermined value.

5. A protective system for a polyphase electric machine comprising impedances for the several phases, means for creating voltage drops across each of said impedances proportional to an electrical quantity in the associated phase or phases, two conductive points, means for obtaining rectified voltages corresponding to said voltage drops, and applying them in parallel across said two conductive points, and an electro-responsive means responsive to the voltage across said two conductive points in the event of a fault condition of said machine.

6. A protective system for a polyphase electric machine comprising impedances for the several phases, means for creating voltage drops across each of said impedances proportional to the current in the corresponding phase, two conductive points, means for obtaining rectified voltages corresponding to said voltage drops, and applying them in parallel across said two conductive points, another impedance means for creating a voltage drop proportional to the residual ground current in said phases, and means for obtaining a rectified voltage corresponding to the last said voltage drop and applying it in parallel across said two conductive points with the other of said voltage drops.

7. A protective system for a polyphase electrical machine comprising a pair of conductive points, potential transformers and current transformers for the phases, means for deriving parallelly-connected unidirectional voltages from said potential transformers, means for deriving parallelly-connected unidirectional voltages from said current transformers, and means connecting the said voltages derived from said first and second means in series opposition to said two conductive points.

8. The system of claim 7 including means for deriving a unidirectional voltage responsive to the residual ground current in said current transformers, connected across said two conductive points.

9. A polyphase electrical apparatus having current incoming and outgoing terminals, a pair of pilot wires connecting said terminals, means for applying relaying voltages to the pilot wires at each terminal to provide relaying currents at each terminal representative, at all times, of the polyphase current-conditions at each terminal of said apparatus, said last means comprising means for deriving at each terminal, a single unidirectionally pulsating electrical relaying quantity for providing the said relaying voltages at the associated terminal, and means at each terminal responsive to a predetermined relation of the said voltages applied to said pilot wires.

10. A terminal having polyphase currents, a second terminal having polyphase currents, a pair of pilot wires connecting said terminals, means at each terminal for applying voltages to the ends of the pilot wires at the respective terminals, comprising means yielding individual unidirectional functions of voltage for respective individual phase currents, all of which are applied in parallel to the pilot wires, and means responsive to a predetermined relation of the said voltages at each terminal.

11. Fault responsive means for protecting a polyphase electrical apparatus having current ingoing and outgoing terminals, comprising means for deriving at each terminal a single unidirectional electrical relaying quantity representative of the currents in said apparatus at the associated terminal, and force producing means at each terminal continually biased by said unidirectional electrical relaying quantities including means at each terminal operable by and responsive to a predetermined relation of said unidirectional relaying quantities for effecting a fault responsive operation.

12. In a differential protective system for a line section of a polyphase transmission line having two separated terminals, current transformers having their primaries star connected for certain of said phases at each terminal, resistances connected across the secondary of each of said current transformers, the resistances for corresponding phases at the terminals being equal, but the resistances for different phases at each terminal being different, a pilot wire means connecting said terminals, rectifier means connecting said resistances at each terminal in parallel across said pilot wire means, and a responsive relay means at each terminal electrically connected to said pilot wire means for operation by a fault in said line section.

13. The system of claim 12 characterized by each terminal having resistances connected in the neutral connection of said star connected primaries, and rectifier means connecting the last said resistances at each terminal to said pilot wire means.

14. The system of claim 5 including a marginal relay connected across said conductive points.

15. An electrical system for a polyphase alternating current machine comprising current transformers for several phases, resistances across each of the secondaries of the said current transformers, a pair of conductive points, connections from one side of each of said resistances to one of said conductive points, separate connections from the other side of each of said resistances to said other conductive point, and rectifiers in each of the last said connections poled in the same direction.

16. A protective system for a polyphase electrical machine comprising potential transformers for said phases, a pair of connecting points, means for deriving unidirectional voltages from said potential transformers, connections for applying said voltages in parallel to said points, current transformers for said phases, means for deriving unidirectional voltages from said current transformers, a conductive point, means for applying the last said voltages in parallel between one of the said connection points and said first conductive point, the last said voltages being in opposition to the first said voltages, a second conductive point, and connections from the second of said connection points to the second of said conductive points.

17. A protective system for a polyphase electrical machine comprising potential transformers for said phases, a pair of connecting points, means for deriving unidirectional voltages from said potential transformers, connections for applying said voltages in parallel to said points, current transformers with star-connected secondaries for said phases, a pair of conductive points, a connection from the neutral of said star-connected secondaries to one of said conductive points, and a rectifier in said connection, impedances for each of said current transformers, each having one end connected to the second conductive point and the other end to the associated secondary, connections from the said other ends of said impedances to one of said connection points, rectifiers in the last said connections, and a connection from the other of said connection points to said one of said conductive points.

18. A protective system for a polyphase electrical machine comprising potential transformers for said phases, a pair of connecting points, means for deriving unidirectional voltages from said potential transformers, connections for applying said voltages in parallel to said points, current transformers with star-connected secondaries for said phases, a pair of conductive points, a connection from the neutral of said star-connected secondaries to one of said conductive points, and a rectifier in said connection, impedances for each of said current transformers, each having one end connected to the second conductive point and the other end to the other end of the associated secondary, connections from the said other ends of said impedances to one of said connection points, rectifiers in the last said connections, and a connection including a rectifier from the other of said connection points to the said one conductive point, an impedance across said conductive points, and an impedance from the neutral of said secondaries to the said second conductive point.

19. The system of claim 17 in which said impedances are resistances.

20. The system of claim 18 in which said impedances are resistances.

21. The combination with a polyphase electrical apparatus which is subject to faults involving any combination of phases to ground, or involving any combination of phases only; of a protective system responsive to any type of said faults, said protective system including means for deriving factors variable with electrical quantities of said electrical system, comprising those present when the system is subject to any one of said types of faults, and means to combine said factors into a single unidirectional discriminating function indicative of said electrical quantities in said electrical system, a pair of conductive points, and means connecting the combining means to said points.

22. Protective relaying equipment for a polyphase electrical apparatus, comprising a first electro-responsive means for deriving an alternating-current quantity which is responsive, in some measure, to a predetermined electrical-quantity-function of said protected apparatus for responding, in some manner, to a predetermined kind of fault in said protected apparatus a second electro-responsive means for deriving an alternating-current quantity which is responsive, in some measure, to another predetermined electrical-quantity-function of said protected apparatus for responding, in some manner, to a different predetermined kind of fault in said protected apparatus, a rectifier-means associated with each of said current-responsive means each deriving a direct-current relaying-quantity which is selectively responsive, in some manner, to the absolute value of the alternating current quantity derived by its associated electro-responsive means, circuit-means including both of said direct-current relaying-quantities poled in the same direction in parallel-circuit relation to each other, and a discriminatory fault-detecting direct-current relaying-means energized from said circuit-means for detecting the attainment of a predetermined absolute magnitude in either one of said derived alternating-current relaying-quantities for detecting faults in said apparatus.

23. Protective relaying equipment for a polyphase electrical apparatus, comprising current-responsive means for deriving an alternating-current quantity which is responsive to a residual current in said protective apparatus, rectifier-means associated with said current-responsive means for deriving a direct-current relaying-quantity which is selectively responsive to the absolute value of the residual current in said apparatus, and a discriminatory fault-detecting direct-current relaying-means associated with said rectifier-means so as to be responsive, in some manner, to the attainment of a predetermined absolute magnitude of a unidirectional electrical output-quantity of said rectifier-means for affording a selective response to a predetermined fault-condition involving a predetermined residual current in said apparatus.

24. The combination, with a polyphase alternating-current transmission-line section to be protected, and line-segregating circuit-interrupting means for disconnecting the line from other apparatus, of line-fault-responsive relaying means for actuating said line-segregating circuit-interrupting means so as to effect a disconnecting operation; said line-fault-responsive relaying means being of a type which utilizes a current obtained from some other point of the transmission line for assisting in protecting the line-section against internal faults while avoiding a line-segregating circuit-interrupting operation in the event of a transmission-line fault occurring beyond said other point; characterized by said line-fault-responsive means including means for deriving, at said other point and at a second similar point of said transmission line, a single unidirectionally pulsating electrical relaying-quantity functionally representative, at all times, of the said polyphase alternating-current transmission-line conditions at the associated point, communicating-channel means for providing, in some measure, both said unidirectionally pulsating electrical relaying-quantities at said relaying point, and electro-responsive means at said relaying point for responding, in some manner, to a combination of both of said unidirectionally pulsating relaying-quantities at said relaying point, to effect a predetermined control over the line-segregating circuit interrupting means.

25. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point, characterized by said line-fault-responsive relaying-means including means responsive approximately to alternate half-cycles of a line-current function at the relaying point for providing a first unidirectionally pulsating relaying-current at said relaying point, communicating-channel means responsive approximately to alternate half-cycles of a corresponding line-current function at said other point for providing, at the relaying point, a second unidirectionally pulsating relaying-current which is responsive, in some measure, to said line-current function at said other point, the unidirectional pulsations of the two unidirectionally pulsating relaying-currents at said relaying point being approximately coincident in time-phase in the event of a transmission-line fault occurring beyond said other point, and electro-responsive means at the relaying point for differentially responding, in some measure, to both of said unidirectionally pulsating relaying currents at said relaying point, to effect a predetermined control over the line-segregating circuit-interrupting means.

26. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line-current function at the relaying point for providing a first unidirectionally pulsating relaying-current at said relaying point, communicating-channel means responsive approximately to alternate half-cycles of a corresponding line-current function at said other point for providing, at the relaying point, a second unidirectionally pulsating relaying-current which is responsive, in some measure, to said line-current function at said other point, and electro-responsive means at the relaying point for responding, in some measure, to some function of the relative phases of the two unidirectionally pulsating relaying-currents at said relaying point, to effect a predetermined control over the line-segregating circuit-interrupting means.

27. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive approximately to alternate half-cycles of a predetermined alternating-current function of current in one of said terminals for producing a first intermittently pulsating force having force-periods each lasting for approximately a half-cycle, alternating with substantially no-force periods lasting for the remaining times between alternate half-cycles of the current-function in the associated terminal, means responsive approximately to alternate half-cycles of a corresponding alternating-current function of a current in the other terminal for producing a second intermittently pulsating force having force-periods each lasting for approximately a half-cycle, alternating with substantially no-force periods lasting for the remaining times between alternate half-cycles of the current-function in the associated terminal, the pulsations of said first and second intermittently pulsating forces being approximately in phase with each other when fault-current is flowing through the protected apparatus to some faulted point outside of the apparatus, and relay-operating means effective to effect a predetermined rleay-response in response to said first and second intermittently pulsating forces when they are in a predetermined manner out of phase with each other.

EDWIN L. HARDER.